United States Patent
Wang

(10) Patent No.: US 12,191,074 B2
(45) Date of Patent: Jan. 7, 2025

(54) DRIVE STRUCTURE, DRIVE DEVICE, AND ELECTRONIC EQUIPMENT

(71) Applicant: New Shicoh Motor Co., Ltd, Zhejiang (CN)

(72) Inventor: Zaiwei Wang, Zhejiang (CN)

(73) Assignee: New Shicoh Motor Co., Ltd, Zhejiang (CN)

( * ) Notice: Subject to any disclaimer, the term of this patent is extended or adjusted under 35 U.S.C. 154(b) by 532 days.

(21) Appl. No.: 17/612,215

(22) PCT Filed: Aug. 28, 2020

(86) PCT No.: PCT/CN2020/112119
§ 371 (c)(1),
(2) Date: Nov. 18, 2021

(87) PCT Pub. No.: WO2022/036749
PCT Pub. Date: Feb. 24, 2022

(65) Prior Publication Data
US 2022/0310297 A1    Sep. 29, 2022

(30) Foreign Application Priority Data
Aug. 19, 2020   (CN) .......................... 202010837776.4

(51) Int. Cl.
*G02B 7/09*   (2021.01)
*H01F 7/08*   (2006.01)
(Continued)

(52) U.S. Cl.
CPC ............... *H01F 7/128* (2013.01); *G02B 7/09* (2013.01); *H01F 7/081* (2013.01); *H01F 7/16* (2013.01)

(58) Field of Classification Search
CPC .. G02B 7/02; G02B 7/09; G03B 13/36; H01F 7/128; H01F 7/081; H01F 7/16
See application file for complete search history.

(56) References Cited

U.S. PATENT DOCUMENTS

| 2018/0213131 A1* | 7/2018 | Liu | H04N 23/54 |
| 2020/0209520 A1* | 7/2020 | Fu | G02B 26/0816 |

FOREIGN PATENT DOCUMENTS

| CN | 101556366 | 10/2009 |
| CN | 110646913 | 1/2020 |

(Continued)

OTHER PUBLICATIONS

"International Search Report (Form PCT/ISA/210) of PCT/CN2020/112119," mailed on May 24, 2021, pp. 1-5.

(Continued)

*Primary Examiner* — Mustak Choudhury
(74) *Attorney, Agent, or Firm* — JCIP GLOBAL INC.

(57) ABSTRACT

A drive structure, including a frame. A carrier assembly and a drive assembly are disposed in the frame; the carrier assembly includes a first carrier and a second carrier disposed on the first carrier; the drive assembly includes a first drive device and a second drive device, the first drive device is mounted in the frame, an output end of the first drive device is connected to and drives the first carrier, the second drive device is mounted on the first carrier, and the second drive device is connected to and drives the second carrier. Further, a drive device and an electronic equipment are disclosed.

7 Claims, 10 Drawing Sheets

(51) Int. Cl.
      *H01F 7/128*       (2006.01)
      *H01F 7/16*       (2006.01)

(56) References Cited

FOREIGN PATENT DOCUMENTS

| | | | | |
|---|---|---|---|---|
| CN | 111432096 | | 7/2020 | |
| CN | 111432096 A | * | 7/2020 | ............... G02B 7/04 |
| JP | 2014137568 | | 7/2014 | |

OTHER PUBLICATIONS

"Written Opinion of the International Searching Authority (Form PCT/ISA/237) of PCT/ CN2020/112119," mailed on May 24, 2021, pp. 1-3.

* cited by examiner

DRIVE STRUCTURE, DRIVE DEVICE, AND ELECTRONIC EQUIPMENT

CROSS-REFERENCE TO RELATED APPLICATION

This application is a 371 of international application of PCT application serial no. PCT/CN2020/112119, filed on Aug. 28, 2020, which claims the priority benefit of China application no. 202010837776.4, filed on Aug. 19, 2020. The entirety of each of the above-mentioned patent applications is hereby incorporated by reference herein and made a part of this specification.

BACKGROUND

Technical Field

The present invention relates to the field of periscope motors, in particular to a drive structure, a drive device, and an electronic equipment.

Description of Related Art

Most of the existing continuous zoom drive mechanisms have a combination structure of two lenses or three lenses. Among them, at least two lenses in such a drive mechanism are movable, and are respectively driven. The continuous zoom function is realized by two existing drive mechanisms, which usually have the same type of drive mode.

The above-mentioned drive mechanisms have the shortcomings: the respective drive modes of the two lenses cause position deviation in the optical axis direction to affect the imaging effect, a higher requirement for accuracy cannot be met, and the focus speed is relatively slow.

SUMMARY

In light of the shortcomings in the prior art, the objective of the present invention is to provide a drive structure, a drive device, and an electronic equipment to solve the problems existing in the prior art.

The technical problems solved by the present invention can be realized by the following technical solutions:

A drive structure, including a frame,

A carrier assembly and a drive assembly are disposed in the frame;

The carrier assembly includes a first carrier, and a second carrier disposed on the first carrier;

The drive assembly includes a first drive device and a second drive device,

The first drive device is mounted in the frame,

An output end of the first drive device is connected to and drives the first carrier, The second drive device is mounted on the first carrier, The second drive device is connected to and drives the second carrier.

Further, a slide rail is disposed in the frame, the first carrier is movably mounted on the slide rail, the first drive device is disposed on a side of the first carrier, and the first drive device drives the first carrier to move along the slide rail;

The second drive device and the second carrier are disposed on a rear side of the first carrier, and the second drive device is connected to and drives the second carrier.

Further, a housing is disposed on the outer side of the frame, an upper cover is disposed on the top of the frame, and the carrier assembly and the drive assembly are mounted in a cavity formed by the frame, the housing and the upper cover.

Further, a side of the frame is provided with a mounting groove, the front side of the first carrier is provided with a front opening, the rear side of the first carrier is provided with a rear opening, and the second drive device is mounted in the rear opening.

Further, the front side of the frame is provided with a first light path through hole, the rear side of the frame is provided with a second light path through hole, and a third light path through hole is formed between the front opening and the rear opening of the first carrier.

Further, the slide rail is disposed at two places, and the two slide rails are respectively located in the frame at two ends of the first carrier; the two ends of the first carrier are provided with through holes, and are sleeved on the slide rails via the through holes.

The two ends of the first carrier are provided with clamping structures, and are sleeved on slide rail supports via elastic pieces of the clamping structures.

Further, the first drive device adopts piezoelectric drive, and the second drive device adopts electromagnetic drive.

Further, a side of the first carrier is provided with a semicircular open groove, a transmission shaft of the first drive device is disposed in the open groove, a limit elastic piece is disposed on the end face of the open groove, and the limit elastic piece is fixedly connected with the first carrier via a screw. A drive device includes the above-mentioned drive structure.

An electronic equipment includes the above-mentioned drive device.

Compared with the prior art, the present invention has the following beneficial effects:

1. The traditional continuous zoom motor drive structure is replaced by a combination of different types of first drive motor and second drive motor, with higher focus accuracy.

2. The piezoelectric motor drives the first carrier to realize synchronous movement of the second lens mounting body and the third lens mounting body so as to realize a zoom function, and the second drive device disposed on the second carrier drives the third lens mounting body to achieve focus of higher accuracy.

DESCRIPTION OF THE EMBODIMENTS

Figure 1:
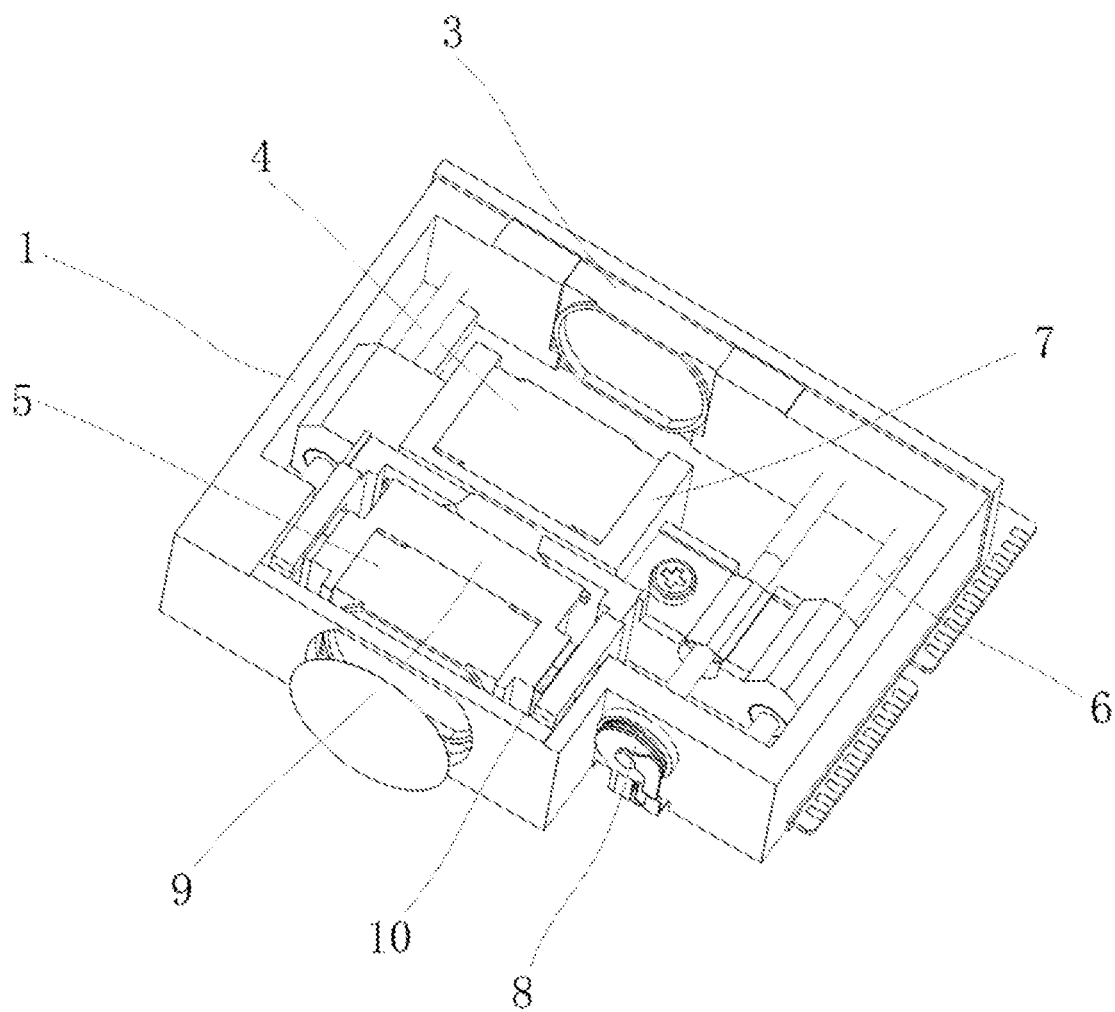
FIG. 1 is a schematic diagram of a drive structure (without any lens) according to the present invention.
Figure 2:
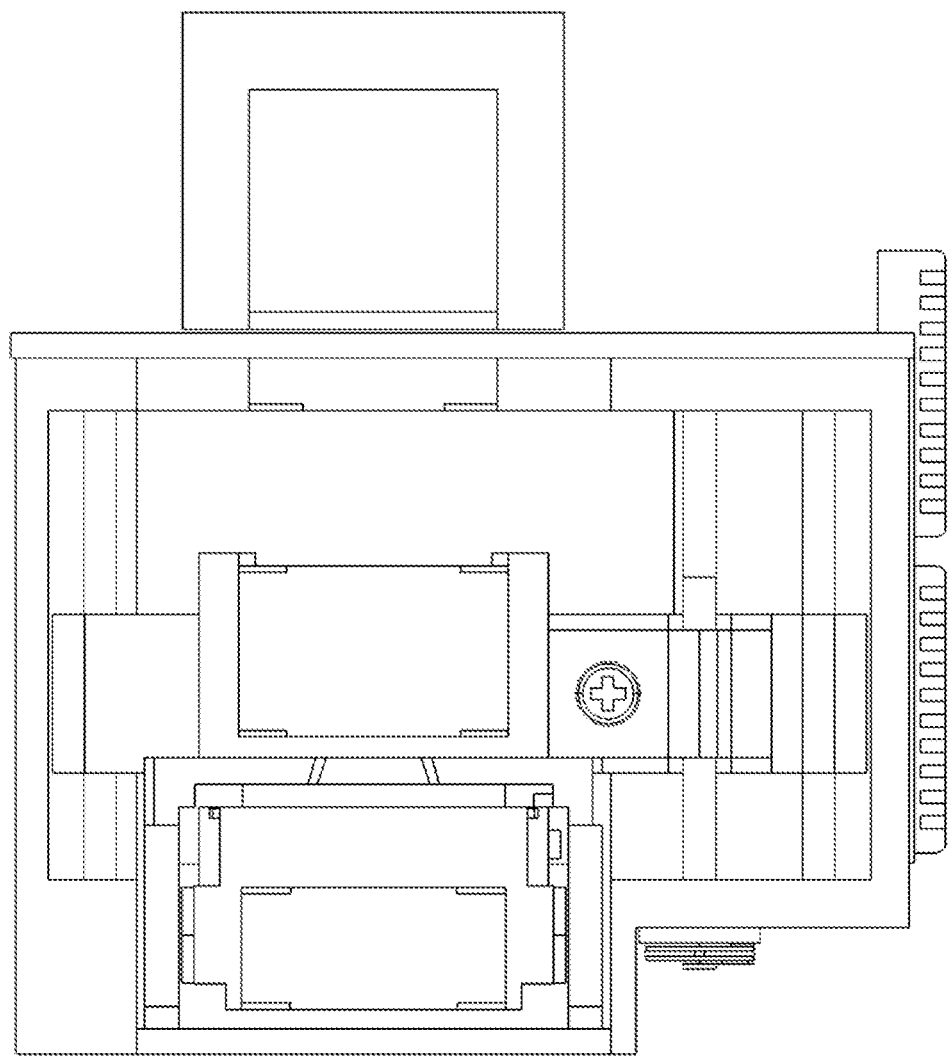
FIG. 2 is a top view of the drive structure according to the present invention.
Figure 3:
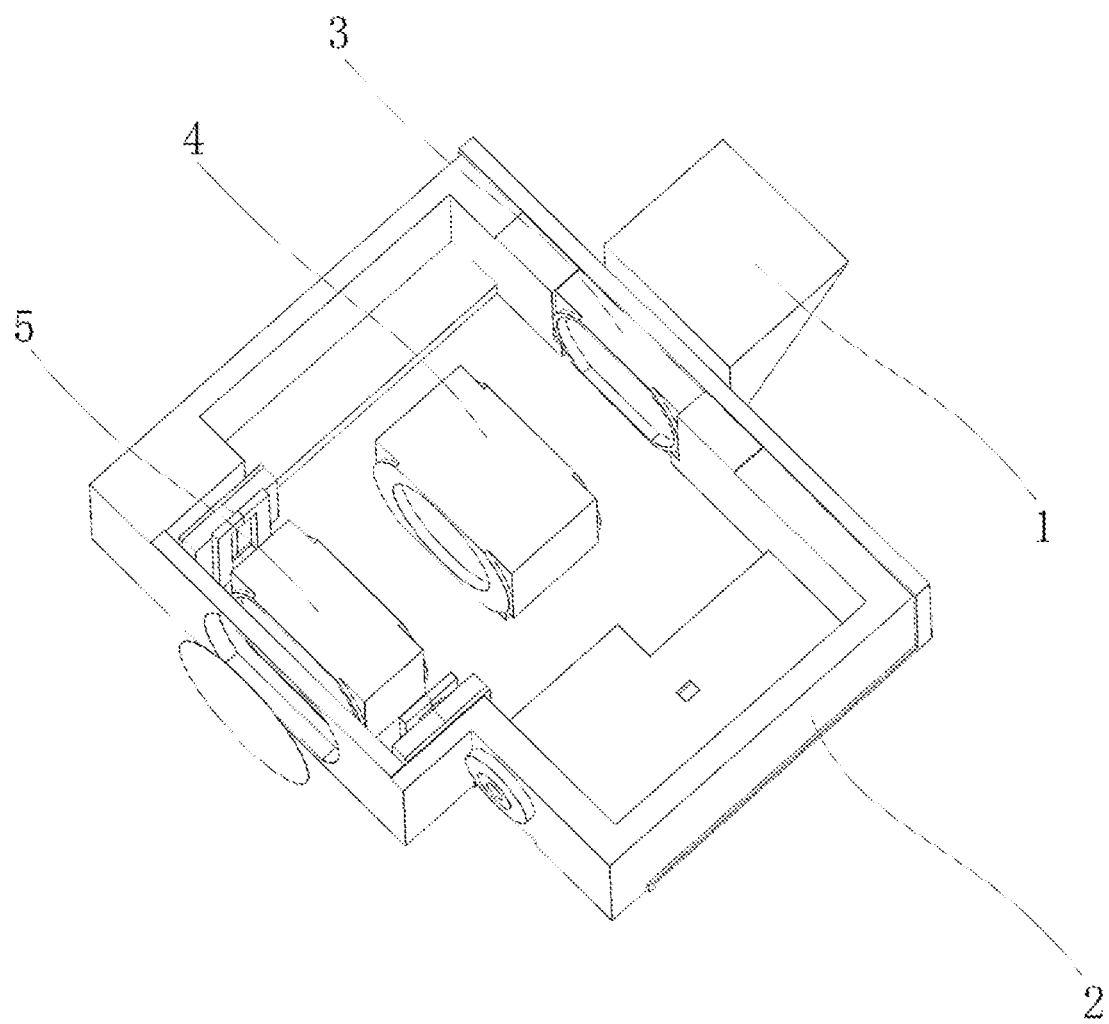
FIG. 3 is a schematic distribution diagram of lenses along the light path of a prism according to the present invention.
Figure 4:
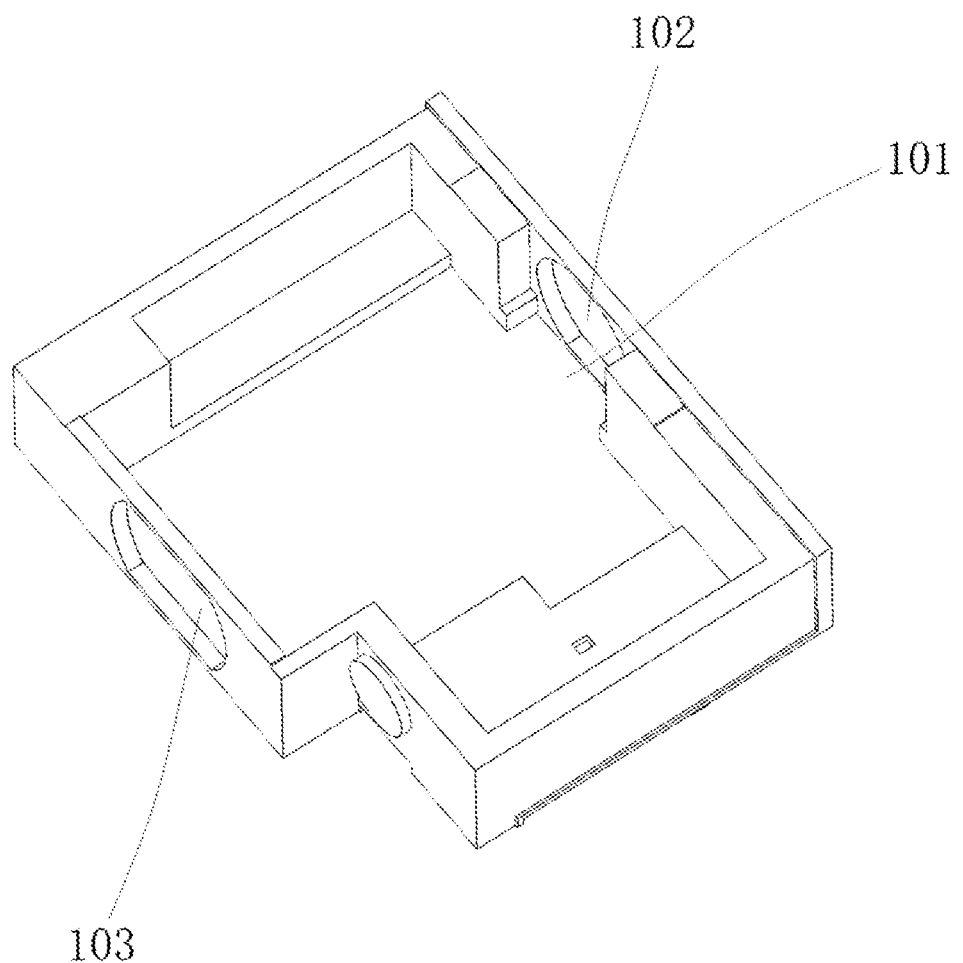
FIG. 4 is a schematic structural diagram of a frame according to the present invention.
Figure 5:
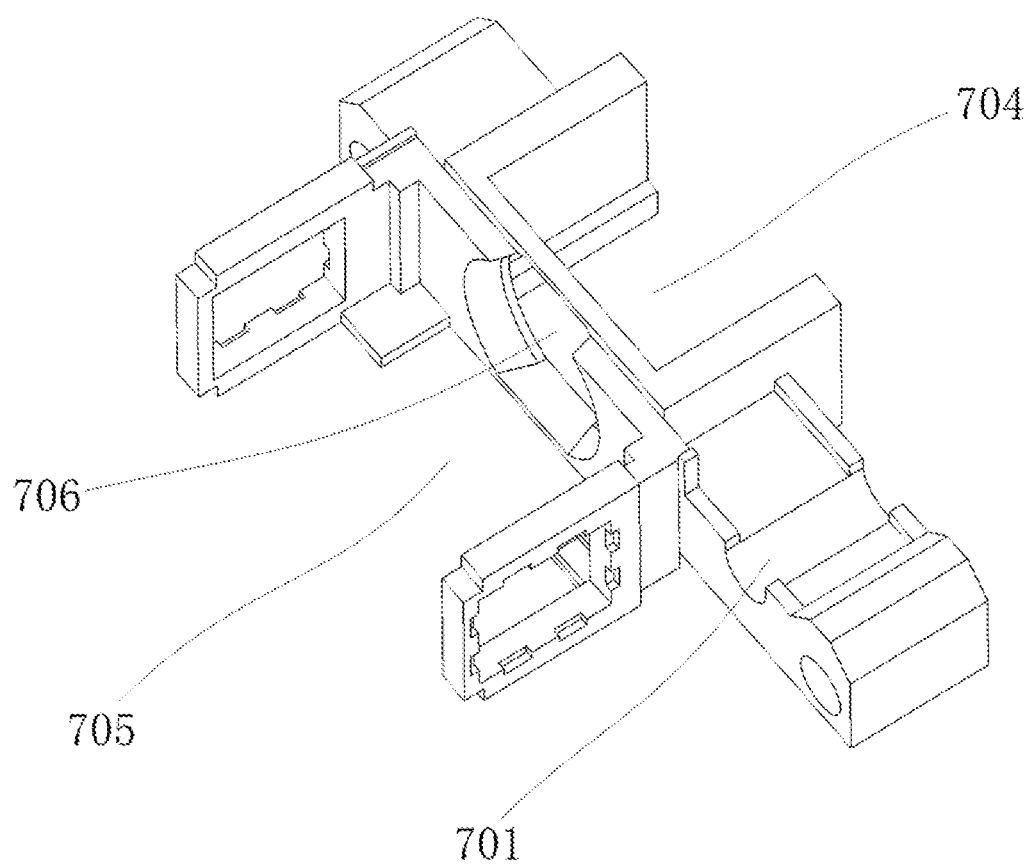
FIG. 5 is a schematic structural diagram of a first carrier according to the present invention.
Figure 6:
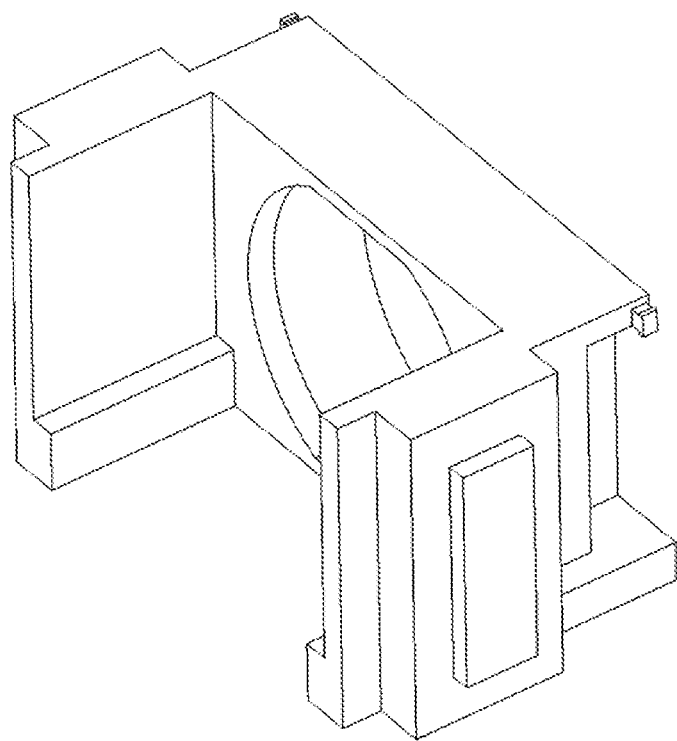
FIG. 6 is a schematic structural diagram of a second carrier according to the present invention.
Figure 7:
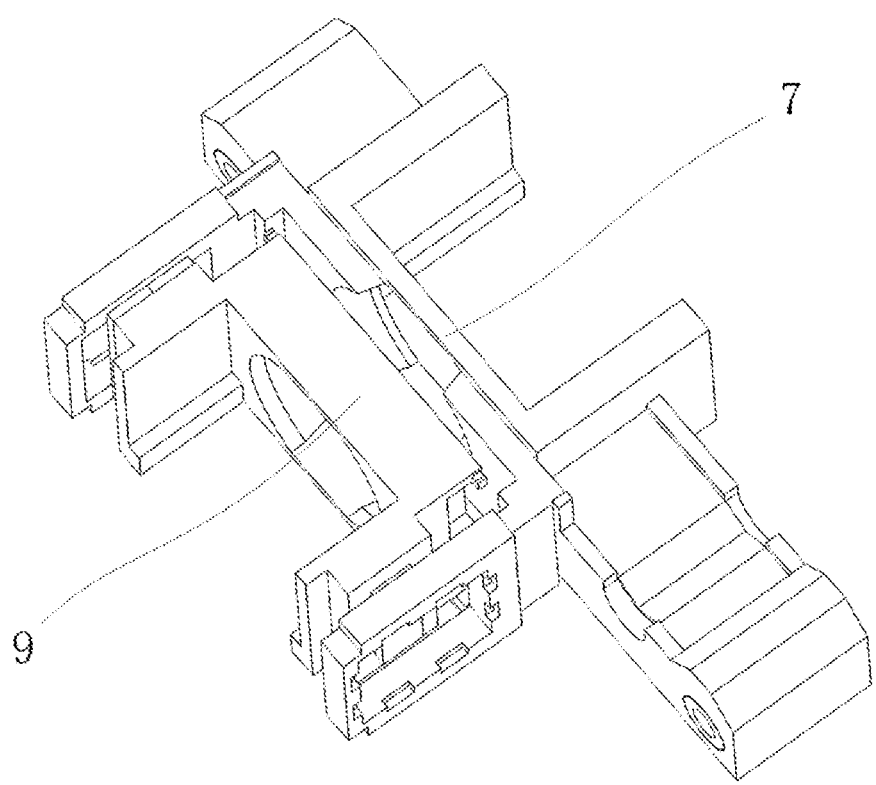
FIG. 7 is a schematic diagram of positions of the first carrier and the second carrier according to the present invention.
Figure 8:
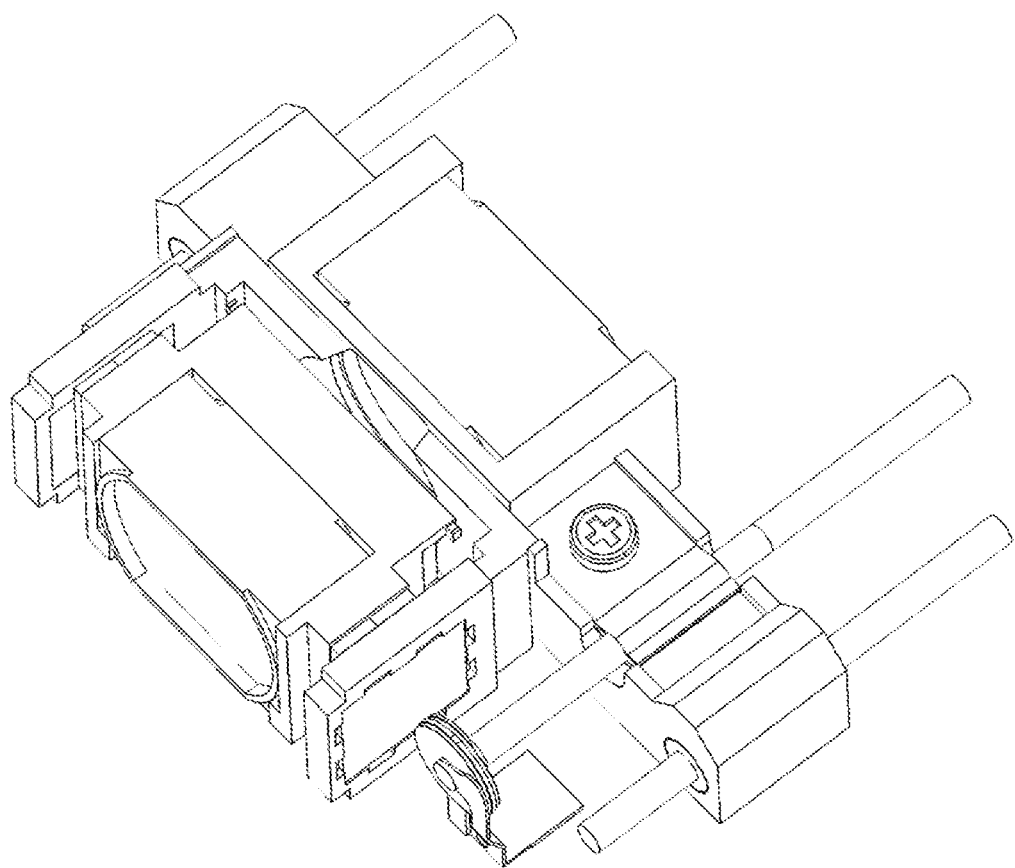
FIG. 8 is a schematic diagram of a structure within the frame according to the present invention.
Figure 9:
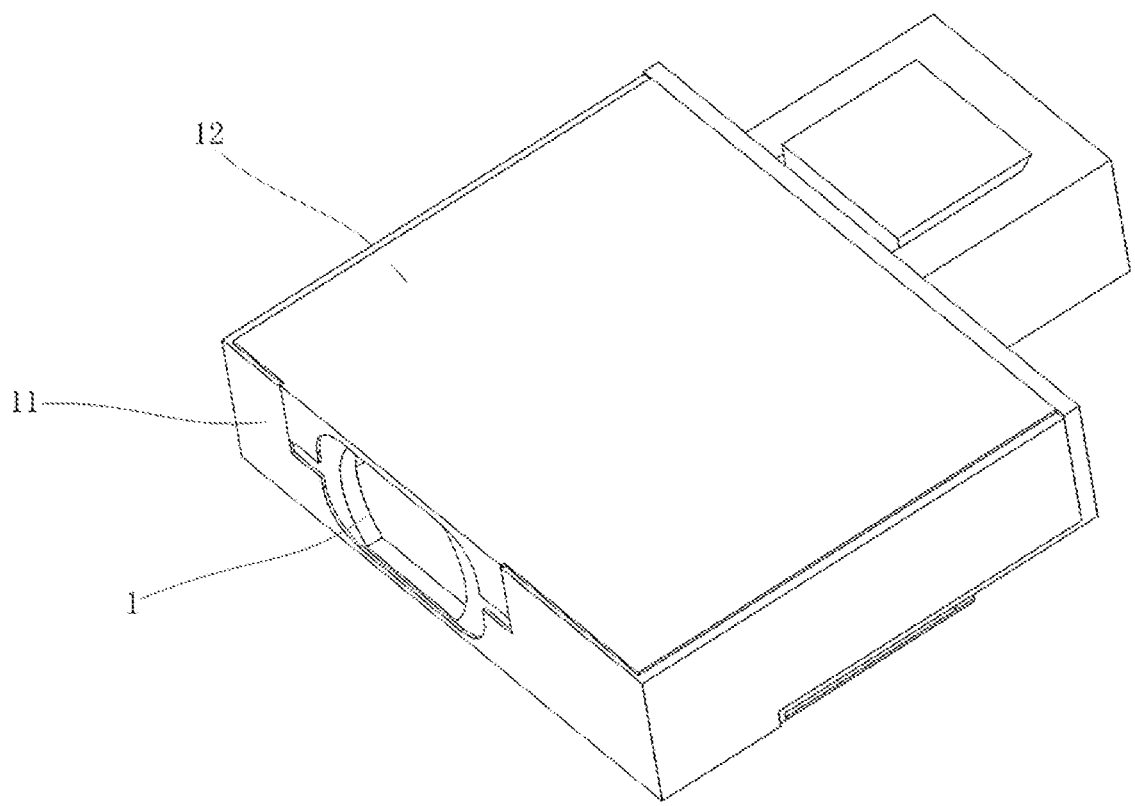
FIG. 9 is a schematic diagram of positions of the frame, a housing and an upper cover according to the present invention.
Figure 10:
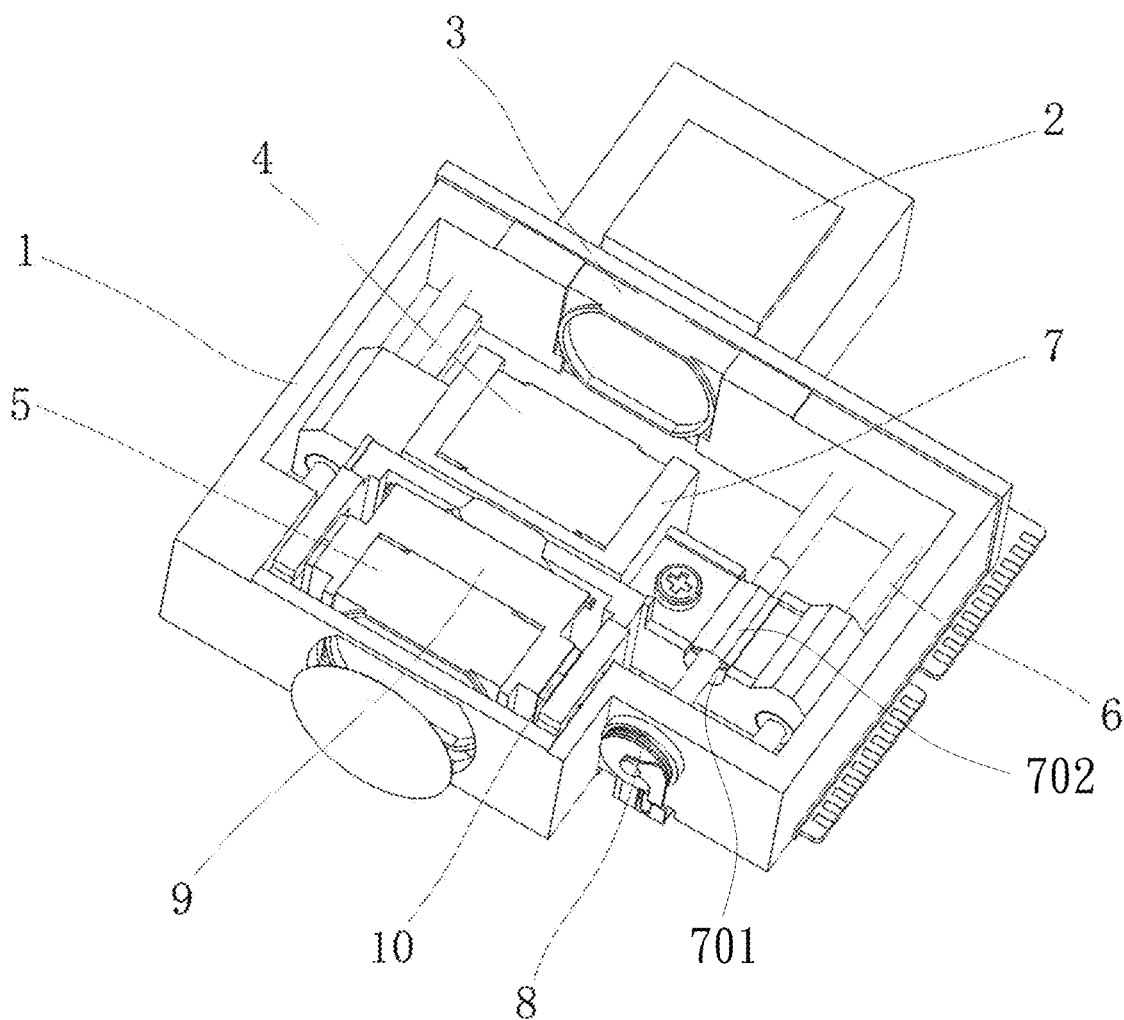
FIG. 10 is a schematic diagram of Embodiment 1 according to the present invention.

In order to make the technical means, creative features, objectives and effects of the present invention easy to understand, the present invention will be further explained below in conjunction with specific embodiments.

Referring to FIGS. 1 to 10, a drive structure of the present invention includes a frame (1), but does not include a prism (2) that is disposed on a lens optical axis side of the frame (1) and can allow light to enter, and a carrier assembly, a lens assembly and a drive assembly are disposed in the frame (1).

The carrier assembly includes a first carrier (7) and a second carrier (9) disposed on the first carrier (7);

The lens assembly includes a first lens mounting body (3) fixedly disposed on the frame (1) inside the prism (2), a second lens mounting body (4) disposed on the first carrier (7), and a third lens mounting body (5) disposed on the second carrier (9);

The drive assembly includes a first drive device (8) and a second drive device (10), the first drive device (8) is mounted in the frame (1), an output end of the first drive device (8) is connected to and drives the first carrier (7), the second drive device (10) is mounted on the first carrier (7), and the second drive device (10) is connected to and drives the second carrier (9).

A slide rail (6) is disposed in the frame (1), the first carrier (7) is movably mounted on the slide rail (6), the first drive device (8) is disposed on a side of the first carrier (7), and the first drive device (8) drives the first carrier (7) to move along the slide rail (6);

The second lens mounting body (4) is fixed on a front side of the first carrier (7);

The second drive device (10) and the second carrier (9) are disposed on a rear side of the first carrier (7), the second drive device (10) is connected to and drives the second carrier (9), and the third lens mounting body (5) is disposed on the second carrier (9).

A housing (11) is disposed on the outer side of the frame (1), an upper cover (12) is disposed on the top of the frame (1), and the lens assembly, the carrier assembly and the drive assembly are mounted in a cavity formed by the frame (1), the housing (11) and the upper cover (12).

A side of the frame (1) is provided with a mounting groove (101), the first lens mounting body (3) is fixedly disposed in the mounting groove (101), the front side of the first carrier (7) is provided with a front opening (704), the second lens mounting body (4) is mounted in the front opening (704), the rear side of the first carrier (7) is provided with a rear opening (705), and the second drive device (10) and the third lens mounting body (5) are mounted in the rear opening (705).

The first lens mounting body (3), the second lens mounting body (4) and the third lens mounting body (5) are distributed in sequence along the light path of the prism (2);

The front side of the frame (1) is provided with a first light path through hole (102), the rear side of the frame (1) is provided with a second light path through hole (103), and a third light path through hole (706) is formed between the front opening (704) and the rear opening (705) of the first carrier (7).

The slide rail (6) is disposed at two places, and the two slide rails (6) are respectively located in the frame (1) at two ends of the first carrier (7).

The two ends of the first carrier (7) are provided with through holes, and are sleeved on the slide rails (6) via the through holes.

The two ends of the first carrier (7) are provided with clamping structures, and are sleeved on slide rail supports (6) via elastic pieces of the clamping structures.

A side of the first carrier (7) is provided with a semicircular open groove (701), a transmission shaft of the first drive device (8) is disposed in the open groove (701), a limit elastic piece (702) is disposed on the end face of the open groove (701), and the limit elastic piece (702) is fixedly connected with the first carrier (7) via a screw (703).

Embodiment 1

A drive structure includes a frame (1), a slide rail (6) is disposed inside the frame (1), a first carrier (7) is movably mounted on the slide rail (6), a piezoelectric motor is disposed on a side of the first carrier (7), and the piezoelectric motor drives the first carrier (7) to move along the slide rail (6);

Referring to FIG. 1, in this embodiment, a prism (2) is mounted on the front side, and a third lens mounting body (5) is mounted on the rear side.

A second lens mounting body (4) is fixed on the front side of the first carrier (7);

A continuous zoom motor and a second carrier (9) are disposed on the rear side of the first carrier (7), and the continuous zoom motor is connected to the second carrier (9), and drives the second carrier (9) and the third lens mounting body (5) to move.

A side of the frame (1) is provided with a mounting groove (101), a first lens mounting body (3) is fixedly disposed in the mounting groove (101), the front side of the first carrier (7) is provided with a front opening (704), the second lens mounting body (4) is mounted in the front opening (704), the rear side of the first carrier (7) is provided with a rear opening (705), and a second drive device (10) and a third lens mounting body (5) are mounted in the rear opening (705).

The first lens mounting body (3), the second lens mounting body (4) and the third lens mounting body (5) are distributed in sequence along the light path of the prism (2);

The front side of the frame (1) is provided with a first light path through hole (102), the rear side of the frame (1) is provided with a second light path through hole (103), and a third light path through hole (706) is formed between the front opening (704) and the rear opening (705) of the first carrier (7).

The slide rail (6) is disposed at two places, and the two slide rails (6) are respectively located in the frame (1) at two ends of the first carrier (7).

The two ends of the first carrier (7) are provided with through holes, and are sleeved on the slide rails (6) via the through holes.

A side of the first carrier (7) is provided with a semicircular open groove (701), a transmission shaft of a first drive device (8) is disposed in the open groove (701), a limit elastic piece (702) is disposed on the end face of the open groove (701), and the limit elastic piece (702) is fixedly connected with the first carrier (7) via a screw (703).

In this embodiment, the first drive device is a piezoelectric drive motor, the second drive device is an electromagnetically driven auto-zoom motor, the auto-zoom motor includes a magnet disposed on the first carrier and a coil disposed on the second carrier, the third lens mounting body is disposed on the second carrier and is movable under the action of the coil and the magnet, and the auto-zoom motor can be controlled by closed-loop control or open-loop control.

Both the piezoelectric motor and the auto-zoom motor in this embodiment adopt the existing technology, so their structure and principle are not described in detail here.

The working principle of this embodiment is as follows:

The first lens mounting body (3) is fixed on the frame (1), the first carrier (7) and the second carrier (9) are driven by the first drive device (8) to move a long distance in the frame (1) along the slide rails (6), incident light refracted by the prism (2) passes through a first lens carried on the first lens mounting body (3) and then passes through a second lens carried on the second lens mounting body (4) and a third lens carried on the third lens mounting body (5), the second lens mounting body (4) realizes a zoom function on the basis of the first drive device (8), and when the second lens mounting body (4) moves, the third lens carried on the second drive device (10) also moves and the second drive device (10) can also adjust the relative distance between the third lens and the second lens on the second lens mounting body (4) to realize a quick focus function.

The second lens mounting body (4) moves for continuous zoom and drives the third lens mounting body (5) synchronously, then the relative positions of the third lens carried on the third lens mounting body (5) and the first lens carried on the first lens mounting body (3) can also be quickly adjusted, and because the second drive device (10) and the slide rail support carrying the second lens mounting body (4) run synchronously, cumulative errors caused by the possibility that different lens carriers deviate from the optical axis under the drive of the same moving part in the past are avoided in the optical axis direction. The motor of the present invention has a small change in Tilt in the optical axis direction, so a relatively high shooting accuracy can be achieved.

Embodiment 2

A drive device includes the drive structure as described in Embodiment 1. In this embodiment, the other structures of the drive device are the same as those in the prior art, so details are not described here.

Embodiment 3

An electronic equipment includes the drive device as described in Embodiment 2. In this embodiment, the other structures of the electronic equipment are the same as those in the prior art, so details are not described here.

The basic principles, main features and advantages of the present invention are shown and described above. Those skilled in the art should understand that the present invention is not limited by the above embodiments, the above embodiments and the description only illustrate the principles of the present invention, and the present invention will have various changes and improvements without departing from the spirit and scope of the present invention. For example, the first drive device (8) may also be of a non-piezoelectric drive mode, the second drive device (10) is a linear motor driven by open-loop drive or closed-loop drive, and the drive mechanism in this patent is not limited to any type of lens drive device. For ease of description, the drive mechanism used in the present invention is a combination of piezoelectric drive and linear motor drive mechanisms, wherein the linear motor is a voice coil motor. These changes and improvements fall within the scope of the present invention. The scope of the present invention is defined by the appended claims and equivalents thereof.

What is claimed is:

1. A drive structure, comprising a frame,
a carrier assembly and a drive assembly are disposed in the frame;
the carrier assembly comprises a first carrier,
and a second carrier disposed on the first carrier;
wherein:
the drive assembly comprises a first drive device and a second drive device,
the first drive device is mounted in the frame,
the first drive device is connected to and drives the first carrier,
the second drive device is mounted on the first carrier,
and the second drive device is connected to and drives the second carrier,
wherein, a slide rail is disposed in the frame, the first carrier is movably mounted on the slide rail, the first drive device is disposed on a side of the first carrier, and the first drive device drives the first carrier to move along the slide rail;
the second drive device and the second carrier are disposed on a rear side of the first carrier.

2. The drive structure according to claim 1, wherein a housing is disposed on an outer side of the frame, an upper cover is disposed on a top of the frame, and the carrier assembly and the drive assembly are mounted in a cavity formed by the frame, the housing and the upper cover.

3. The drive structure according to claim 1, wherein a side of the frame is provided with a mounting groove, a front side of the first carrier is provided with a front opening, the rear side of the first carrier is provided with a rear opening, and the second drive device is mounted in the rear opening.

4. The drive structure according to claim 3, wherein the front side of the frame is provided with a first light path through hole, the rear side of the frame is provided with a second light path through hole, and a third light path through hole is formed between the front opening and the rear opening of the first carrier.

5. The drive structure according to claim 1, wherein the slide rail is disposed at two places, and the two slide rails are respectively located in the frame at two ends of the first carrier; the two ends of the first carrier are provided with through holes, and are sleeved on the slide rails via the through holes.

6. The drive structure according to claim 1, wherein the two ends of the first carrier are provided with clamping structures, and are sleeved on slide rail supports via elastic pieces of the clamping structures.

7. The drive structure according to claim 1, wherein a side of the first carrier is provided with a semicircular open groove, a transmission shaft of the first drive device is disposed in the open groove, a limit elastic piece is disposed on an end face of the open groove, and the limit elastic piece is fixedly connected with the first carrier.

* * * * *